Jan. 30, 1962
M. TISCHLER
3,018,568
ELECTRONIC PLASTIC BLOCK ARRANGEMENT
Filed Nov. 12, 1957
2 Sheets-Sheet 1
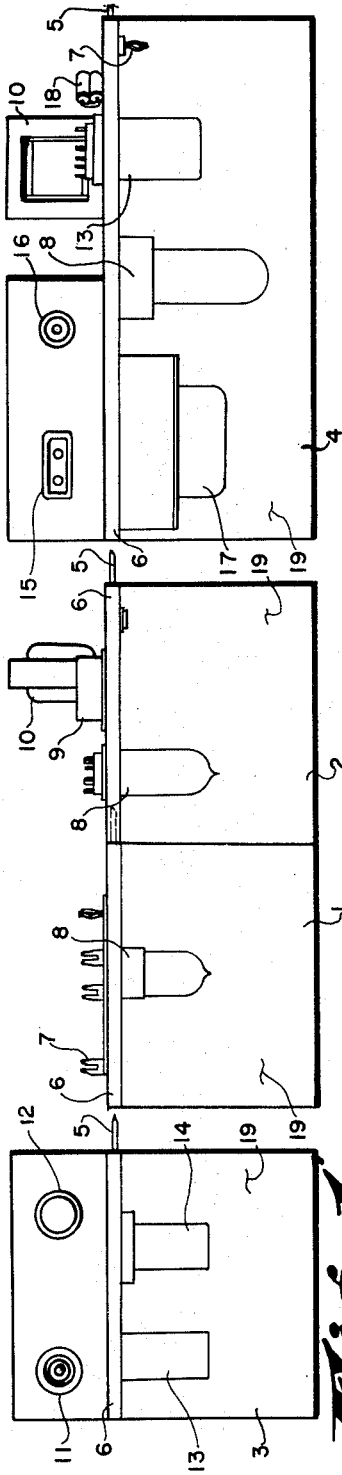
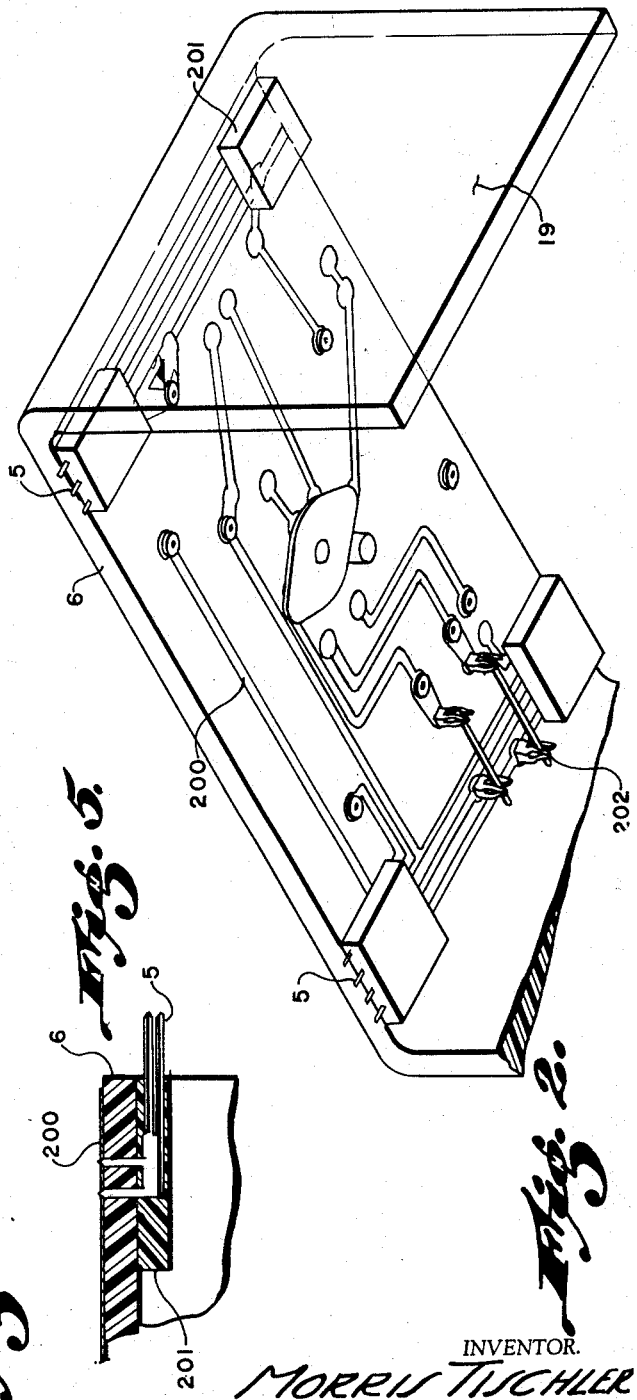
INVENTOR.
MORRIS TISCHLER
BY Walter G. Finch
Francis J. Meagher
ATTORNEYS Jan. 30, 1962 M. TISCHLER 3,018,568
ELECTRONIC PLASTIC BLOCK ARRANGEMENT
Filed Nov. 12, 1957 2 Sheets-Sheet 2

INVENTOR.
MORRIS TISCHLER
BY Walter G. Finch
Francis J. Meagher
ATTORNEYS

United States Patent Office 3,018,568
Patented Jan. 30, 1962

3,018,568
ELECTRONIC PLASTIC BLOCK ARRANGEMENT
Morris Tischler, Baltimore, Md., assignor to Electronic Aids, Inc., Baltimore, Md., a corporation of Maryland
Filed Nov. 12, 1957, Ser. No. 695,604
1 Claim. (Cl. 35—19)

This invention relates generally to laboratory apparatus and lecture demonstration displays, and more particularly to operable display circuits for teaching the essentials of electronics.

The invention is, however, applicable to fields other than education, such as industrial design experimentation where prewired circuits are used, and sales demonstration. It is to be understood that its usefulness is not limited solely to teaching.

One of the chief problems in teaching the theory and practice of electronics is to demonstrate the functions of electronic elements working together as units. Clear visualization of circuits by the student is essential, as is his ability to relate to these circuits their schematic diagrams. Conventionally wired circuits, with overlapping wires mounted to opaque chassis of metal or insulating board, limit the view of the student, and particularly of groups of students, and make circuit tracing laborious.

Another problem in laboratory practice is the time wasted in connecting experiments and the preparation before the experiment can start. No time is required when using the assemblies of the present invention to connect wires or insert parts, since all chassis are interlocking electrically as well as mechanically. The small space required for the experimental plastic blocks of the present invention, makes practical large laboratory groups with many experimental stations. Because of the arrangement of plug-in parts and quickly assembled chassis, an entire laboratory course can be conducted without the use of tools.

Again, in conventional circuit displays of even modest complexity, close proximity of several sub-circuits, or component circuits, causes the student difficulty in separating a particular circuit from the rest, and thus hinders his understanding of the contribution of the parts to the whole. And often the actual wiring bears little superficial resemblance to the schematic diagram of the circuit which is an unnecessary complication at early stages of a student's electrical education.

Finally, in conventionally wired circuits it is usually difficult to remove one stage, or component circuit, from the complete circuit, and to substitute another component circuit, for purposes of comparison and test. The result is that there is little that the student can do by himself in circuit substitution, because of safeguards which must be observed to protect the teaching apparatus. This is also important in the industrial application.

The basic prewired circuits are arranged so that the electrical components can be easily unplugged without the use of tools. This arrangement permits the electrical circuit characteristics to be altered by inserting components of various values. The trainee is thus permitted to design circuits without wasting the time to wire them.

Therefore, in view of these and other shortcomings of currently available electronics demonstration equipment, it is a chief object of this invention to provide operable electronic circuit display equipment which will permit clear visualization of circuit form and function by the student through the provision of orderly layout, clear view, close resemblance between schematic diagram and circuit, and ready, mistake-free substitution of component circuits.

Another object of this invention is to provide display circuits which are economical to manufacture, buy and use, in that many students simultaneously can trace visually and with test instruments the electrical path in an individual unit of apparatus.

Another object of this invention is to provide display circuits which are easy to use, which are portable, durable, foolproof, and which require minimum storage space.

Another object of this invention is to provide experimental units which may be arranged into an electronic system so as to determine characteristics of said system. Improvements in the system can be easily altered by inserting circuits or by changing components.

Another object of the invention is to make possible large scale training programs for the teaching of trouble shooting techniques. The blocks arranged in a system permit small groups to trouble shoot for faulty parts which may be placed into individual unit blocks.

These and other objects and advantages of this invention will become more readily understood from the accompanying specification and drawings in which:

FIG. 1 is an elevation of an assembly of component circuit units comprising this invention;

FIG. 2 is a perspective, looking into the lower side of one of said component circuit units;

FIG. 5 is a section through an assembly unit-connector of one of said units.

Figure 3:
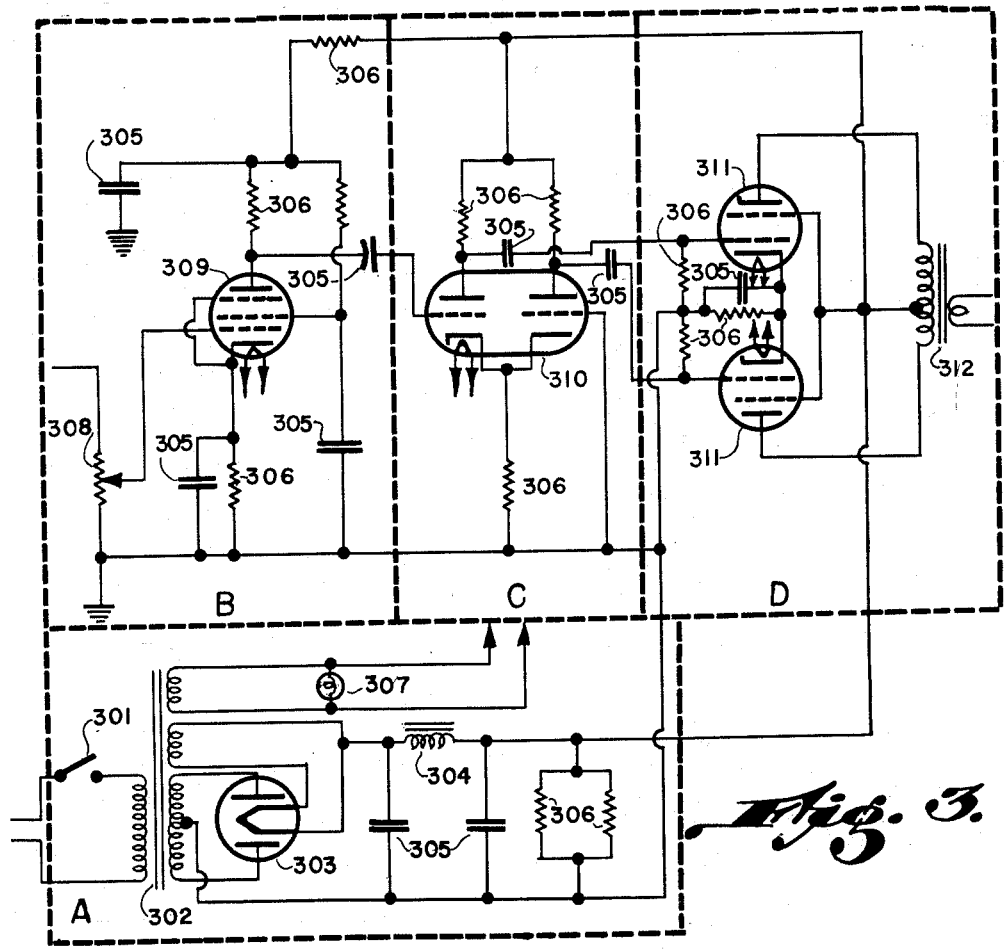
FIG. 3 is a circuit diagram.

In accordance with the invention, there is provided novel experimental and teaching apparatus comprising electrically matched prepackaged, integrally diagrammed component circuit-units, fitted for quick interconnection, to form complete, operable, useful electronic circuits.

Referring now to FIG. 1 of the drawing, there is illustrated a group of four of the said pre-packaged component circuit-units, the inner two units 1 and 2 are connected electrically and mechanically, and the outer two units 3 and 4 are in position to be connected to the said inner two units by bayonet type unit-connectors 5, to form a typical, closely grouped, operable, electronic assembly, for demonstration and test purposes.

The component-units are generally similar in structure, being composed typically of a substantially planar chassis 6 to which are fastened commonly used electrical and electronic elements 7–18 as required to assure the function of the component-unit. The chassis 6 is made of transparent dielectric material such as Plexiglas, and is supported on panel type legs 19 of the same material.

FIG. 2 is a perspective drawing which shows use of electrical circuitry 200 substantially of the printed or etched type, in conjunction with unit-connector support blocks 201 of transparent material, transparent chassis 6 and legs 19, and simple bar-switch assemblies 202, to permit fast, easy, visual circuit tracing. Printing circuitry is used because it most closely approximates the format of schematic circuit diagrams.

In this version the unit-connectors 5 are partially embedded in said support blocks 201, which in turn are cemented to the underside of said chassis 6.

Lateral spacing of the unit-connectors within their said support blocks is made the same for any given set of component-units which are electrically suitable for interconnection and substitution and different for other units. Through this device, the apparatus is protected from damage which might result from improper hook-ups.

FIG. 3 is an electric circuit diagram illustrating the interconnection of four component-unit circuits to form a complete, operable, electronic circuit. The heavy dotted lines divide the diagram into four areas, A, B, C, and D, in which areas lie respectively the circuits of the said four component-units, such as were described in connection with FIG. 1. It is to be understood that the electrical interconnections between areas in the diagram are, in the embodiment, effected through means of unit-connectors such as were described in conjunction with FIGURES 1 and 2.

As will be apparent to those skilled in the art, area A in FIG. 3 contains a conventional full-wave filter type power supply circuit comprising a switch 301, power transformer 302, type 5Y3 rectifier tube 303, choke 304, condensers 305, resistors 306, and pilot light 307, while area B contains, in addition to aforesaid condensers and resistors, a potentiometer 308, and a type 6AU6 amplifier tube 309, with all elements being so connected as to form a conventional pentode amplifier stage. Area C contains the condensers and resistors, and a type 12AU7 tube 310, all elements being connected to form a conventional phase inverter circuit; while area D contains said condensers and resistors, two type 6AQ5 tubes 311, and an output transformer 312, with said elements being connected to form a conventional push-pull power amplifier circuit.

The uses and operation of the complete, audio amplifier circuit, achieved by interconnection of the circuits of areas A, B, C, and D, FIG. 3, are well known to those skilled in the electronic communications art, and will not be further elaborated here, since this example is but one of scores of essential and useful electronic devices whose formation and operation can be quickly, easily, and clearly demonstrated through use of the present invention.

Figure 4:
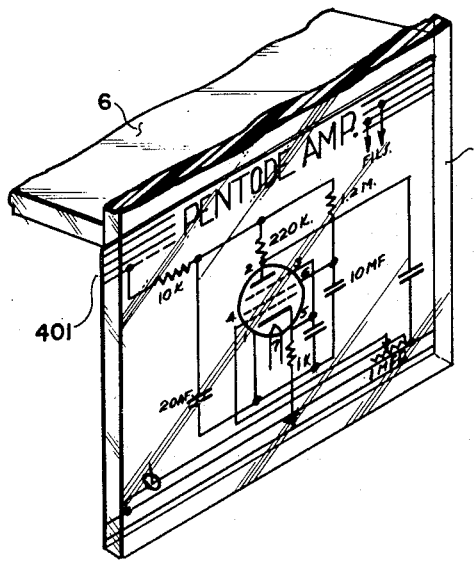
FIG. 4 is a perspective of a supporting leg of one of said units bearing a schematic diagram.

FIG. 4 depicts a circuit diagram 401 affixed to its corresponding circuit-unit in a preferred location; cemented face-out to the inner surface of a panel type leg, 19. This location for said diagram has many advantages, the most important being that, here, the diagrams can be made to be automatically aligned in correct juxtaposition as the component-units are brought together on assembly, so that, in sequence, the contribution of each part to the whole is plainly observable. Additional advantages are that, each diagram is in close proximity to its corresponding circuit, is clearly visible through a wide angle, obscures little of the circuitry mounted to the chassis 6, and finally, is protected from defacement.

FIG. 5 is a section through one of the bayonet type component-unit connections 5, showing its relation to its support block 201, in which it is partially embedded, to the chassis 6, which it pierces, and to a portion of printed circuitry, 200, with which it makes electrical contact, either by means of mechanical pressure or soldering. The support block is cemented to said chassis by one of the adhesives available for bonding Plexiglas. The printed or etched circuit is placed under the Plexiglas which protects it from damage and the experimenter from shock.

Use of a bayonet type connector, located at the side of the chassis 6 and in close proximity to it, as shown in FIGS. 1, 2 and 5, offers many advantages. The component units are brought together in an orderly manner, predictable by the observing students, and at a common height so that any level table can be used in the demonstration without further props or supports; circuit continuity is easily traced through the connectors by the student; it is easy to achieve spacing of the connectors within their mounting coded blocks to permit assembly and substitution of pre-selected component units only, and so to forbid improper connections with possible subsequent damage to the equipment; finally, the bayonet type unit-connectors promote easy, quick, and secure assembly of the component-units in close proximity to one another, and eliminate the need for jumper cords and other such devices.

From the above specification it is apparent that my invention provides an apparatus for laboratory experimentation and lecture demonstration, whereby actual physical circuits and their respective schematic diagrams can be simply and quickly assembled to form a variety of electronic systems which are in the clear view of observers. The composition of each component-unit and its relation and contribution to the final assembled operating circuit may be clearly and quickly shown.

Obviously many other modifications and variations of the present invention are possible in the light of the above applications and teachings. It is, therefore, to be understood, that within the scope of the appended claim, the invention may be practiced otherwise than as specifically described.

What is claimed is:

An electronic circuit lecture demonstration apparatus, comprising several major printed sub-circuits of an operable electronic system, a plurality of optically transparent tables having integral transparent panel-type legs which bear on their inner surfaces and affixed face out, said printed sub-circuits being individually mounted on said plurality of optically transparent tables in one plane, selectively spaced rigid electrical assembly connectors integrally mounted at the edges of said tables, for connecting said printed sub-circuit together to form said operable electronic system and schematic circuit diagrams of said printed sub-circuits, said printed sub-circuits terminating in said selectively spaced rigid electrical assembly connectors, said printed sub-circuits and schematic circuit diagrams when in operable position each forming continuity simultaneously, with each said schematic circuit diagram being arranged on the front of a panel-type leg of its corresponding transparent table to show the wiring and so arranged to add to the circuit of the adjacent transparent table.

References Cited in the file of this patent
UNITED STATES PATENTS

| | | |
|---|---|---|
| 1,968,039 | Hornberger | July 31, 1934 |
| 2,390,706 | Hearon | Dec. 11, 1945 |
| 2,754,486 | Hathorn | July 10, 1956 |
| 2,777,193 | Albright | Jan. 15, 1957 |
| 2,788,470 | Giel et al. | Apr. 9, 1957 |
| 2,836,772 | Wintrode et al. | May 27, 1958 |
| 2,862,992 | Franz | Dec. 2, 1958 |
| 2,882,618 | Thompson | Apr. 28, 1959 |

FOREIGN PATENTS

| | | |
|---|---|---|
| 525,926 | Italy | May 12, 1955 |

OTHER REFERENCES

Proceedings of the I.R.E. December 1955, page 39A, "Formica Research."

R.C.A. Electronic Trainers (pamphlet), pages 2-7 (incl.).